(12) United States Patent
Moore et al.

(10) Patent No.: US 6,571,959 B1
(45) Date of Patent: Jun. 3, 2003

(54) COOLANT FLUID CLEANING METHOD AND APPARATUS

(76) Inventors: Robin C. Moore, 6323 Greystone, Roscoe, IL (US) 61073; David M. Dambek, 1911 Hampton Dr., Wheaton, IL (US) 60187

( * ) Notice: Subject to any disclaimer, the term of this patent is extended or adjusted under 35 U.S.C. 154(b) by 0 days.

(21) Appl. No.: 09/400,937

(22) Filed: Sep. 22, 1999

(51) Int. Cl.$^7$ .............................................. B01D 33/06

(52) U.S. Cl. ....................... 210/394; 210/396; 210/400; 210/402; 210/433.1; 210/526; 210/168

(58) Field of Search ................................ 210/167, 168, 210/400, 331, 394, 396, 402, 433.1, 526

(56) References Cited

U.S. PATENT DOCUMENTS

| | | | |
|---|---|---|---|
| 1,726,608 A | * 9/1929 | Brackett | |
| 2,876,904 A | 3/1959 | Fowler | |
| 4,261,826 A | 4/1981 | Dorgathen | 210/222 |
| 4,440,642 A | * 4/1984 | Frese et al. | 210/387 |
| 4,774,010 A | 9/1988 | Bratten | 210/791 |
| 4,858,769 A | 8/1989 | DeVries | 209/3.1 |
| 4,895,647 A | 1/1990 | Uchiyama | 210/171 |
| 4,992,167 A | 2/1991 | Uchiyama | 210/171 |
| 5,087,358 A | * 2/1992 | Massignani | 210/195.1 |
| 5,116,490 A | * 5/1992 | Fontenot | 210/158 |
| 5,158,691 A | * 10/1992 | McEwen et al. | 210/402 |
| 5,167,839 A | 12/1992 | Widmer, II et al. | 210/784 |
| 5,221,469 A | 6/1993 | Nehls | 210/331 |
| 5,256,290 A | * 10/1993 | Becker et al. | 210/400 |
| 5,389,256 A | * 2/1995 | McEwen et al. | 210/402 |

(List continued on next page.)

FOREIGN PATENT DOCUMENTS

| | | |
|---|---|---|
| EP | 0 388 709 | 9/1990 |
| WO | WO 92 13626 | 8/1992 |

OTHER PUBLICATIONS

Don Dobbins, Filtration System Handles Aluminum Chips, Tooling and Production Magazine, Jul. 2001 Issue, p. 72.

*Primary Examiner*—Robert Popovics
(74) *Attorney, Agent, or Firm*—Lawrence E. Crowe (57) ABSTRACT

An improved coolant cleaning method, system, and apparatus, are provided through the use of a filter disk assembly that defines and is rotatable about an axis of rotation of the disk, for removing particulate matter from a fluid flowing through the filter disk assembly in a direction substantially parallel to the axis of rotation of the filter disk assembly. A coolant cleaning system includes such a filter disk assembly, connected in fluid communication with an apparatus for circulating a flow of fluid through the filter disk assembly in a direction substantially parallel to the axis of rotation of the filter disk assembly. An apparatus for circulating a flow of fluid may include a dirty fluid reservoir, a conveyor for removing chips and particulate matter from the dirty fluid reservoir, a clean fluid reservoir, with the filter disk assembly providing the sole fluid communication path between the dirty and clean fluid reservoirs, and a fluid supply system having a pump for circulating fluid from the clean fluid reservoir through the disk filter assembly. Several filter disk assemblies may feed into a single clean fluid reservoir to achieve high volume flow rates of clean fluid. Alternatively several filter disk assemblies, having filter elements of increasingly finer mesh, feeding into several separate clean fluid reservoirs may be utilized to provide fractionally filtered coolant fluid having varying degrees of cleanliness as required for various machining operations. Embodiments of coolant fluid cleaning systems for machine tools are disclosed. Embodiments depicting retrofit of a filter disk assembly and/or an improved dynamic seal arrangement for a rotating filter according to the invention into prior fluid cleaning apparatus are disclosed. An apparatus is provided for removal of particulate matter from fluid above, below, and between an upper and lower portion of a horizontally traveling hinge belt conveyor.

28 Claims, 5 Drawing Sheets

U.S. PATENT DOCUMENTS

| | | | |
|---|---|---|---|
| 5,423,977 A | | 6/1995 | Aoki et al. .................. 210/107 |
| 5,569,382 A | | 10/1996 | Reynders .................... 219/391 |
| 5,603,846 A | | 2/1997 | Uchiyama et al. .......... 210/748 |
| 5,637,213 A | * | 6/1997 | McEwen et al. ............ 210/330 |
| 5,738,782 A | | 4/1998 | Schafer et al. .............. 210/171 |
| 5,820,756 A | * | 10/1998 | McEwen et al. ............ 210/330 |
| 5,849,183 A | | 12/1998 | Ota et al. .................... 210/168 |
| 5,858,218 A | | 1/1999 | Setlock et al. .............. 210/167 |
| 5,992,642 A | * | 11/1999 | Ota ............................. 210/396 |

* cited by examiner

COOLANT FLUID CLEANING METHOD AND APPARATUS

FIELD OF THE INVENTION

This invention relates to systems for removing particulate matter suspended in a fluid, and more particularly to systems for removing fine particles from fluid utilized in conjunction with the machining of metal or non-metals.

BACKGROUND

There are many applications in which it is necessary for environmental reasons, or for the reclamation and recycling of resources, to separate particulate matter suspended in a liquid from the liquid itself. One example of such an application is the need to remove particulate matter from water used by an industrial floor cleaning machine, or a street sweeping machine, prior to disposing of the water in an environmentally safe manner. Another example of such an application is the removal of waste material from coolant used with cut-off saws or grinding machines. Yet another example of such an application is the necessity to separate chips and fine particles of waste material from coolants used with machine tools to facilitate the machining of metal or non-metallic materials.

The process of machining a workpiece into a finished part on a machine tool requires that a cutter of some sort be forced into the workpiece to carve away waste material portions of the workpiece and achieve the desired shape of the finished part. The action of the cutter against the workpiece generates both a large volume of chips or fine particles of waste material, and a substantial amount of heat in the cutter and workpiece. These chips or particles of waste material, and the heat generated, must be transported away from the cutter and workpiece during the machining process, in order to achieve dimensional accuracy of the finished part, and in order to allow the cutter to operate at the high speeds necessary to effectively and efficiently shape the finished part without overheating.

In order to remove the chips or particles, and the heat generated in the machining process, machine tools generally incorporate some sort of cooling and flushing system for directing a flow of a liquid coolant or oil at the workpiece and cutter during the machining process, to absorb the heat generated at the interface of the cutter and the workpiece, and to transport both the heat and chips or particles away from the cutter and workpiece. After flowing over the cutter and workpiece, the coolant fluid, with the chips or particles entrained, is collected and drained from the machine tool.

Modern machining processes are carried out at very high speeds, requiring a large flow of coolant fluid for effective removal of the chips and heat. Depending upon the machining process involved, a continuous flow of coolant is required during the machining process at flow rates in the range of 10 to 400 gallons a minute. This flow of coolant is typically supplied to the machine tool by a coolant fluid circulating and cleaning system which includes mechanisms for separating the chips and particles from the flow of coolant so that the coolant may be continuously re-circulated.

For larger sized chips or particles of waste material, the primary mechanism for separating the waste material from the cooling fluid involves utilizing the force of gravity. In some coolant cleaning systems utilizing scraper type conveyors, the coolant fluid drained from the machine tool is directed into a dirty fluid reservoir of the coolant cleaning system where the chips and particles are allowed to settle in the bottom of the reservoir. A conveyor mechanism then scrapes across the bottom of the reservoir to pick up the settled chips and particles and transports them to a chip collection bin or container. The coolant above the bottom of the tank is then drawn off by a pump and re-circulated to the machine tool. In other coolant cleaning systems, the coolant with entrained chips and particles is directed onto a screen, or a hinge belt conveyor system, as the fluid enters the dirty fluid reservoir, so that the fluid can run through the screen or hinge belt into the bottom of the reservoir, with the larger sized chips and particles being screened out and separated from the coolant fluid by the screen or hinge belt. The cleaned coolant below the screen or belt is then re-circulated to the machine tool. U.S. Pat. No. 5,858,218 to Setlock et al; U.S. Pat. No. 5,849,183 to Ota et al; U.S. Pat. No. 5,603,846 to Uchiyama et al; U.S. Pat. No. 5,167,839 to Widmer II et al; and U.S. Pat. No. 4,992,167 to Uchiyama; are illustrative of these approaches utilizing the force of gravity to separate the chips and particulate matter from the fluid. U.S. Pat. No. 4,895,647 is also illustrative of these approaches, and includes a permanent magnet disposed on the bottom wall of the reservoir to supplement the force of gravity with magnetic attraction of ferrous chips and particles.

Although these coolant cleaning systems utilizing the force of gravity work reasonably well for larger sized chips and particles, there are several inherent problems involved in the practical application of such systems which have led the designers of such systems to also include additional filtration devices in their systems.

For coolant systems relying on the force of gravity to cause the chips and particles of waste material to settle out on the bottom of the dirty fluid reservoir, one inherent problem is that the flow rates of coolant demanded by modern machining processes do not allow the fluid to remain stagnant in the dirty fluid reservoir long enough for smaller chips and fine particles of waste material to settle out in the bottom of the tank. While it would seem at first glance that theoretically all particles of waste material would eventually settle to the bottom of the tank, given enough time, practical considerations such as limitations on floor space prevent system designers from providing dirty fluid reservoirs large enough for this to happen. For example, a coolant system required to provide 400 gallons per minute of coolant to a machine tool would need to have a dirty fluid reservoir capable of holding 2000 gallons of coolant in order to allow the coolant to remain in the reservoir for a period of five minutes before being re-circulated to the machine tool. In practice, a reservoir this large simply takes up too much floor space for most applications, and as a compromise, the dirty fluid reservoir capacity of many coolant cleaning systems is designed to hold only enough coolant for the coolant to remain in the reservoir a minute, or a minute and one half at the most, before being re-circulated. This means that the coolant in the reservoir is never really stagnant, but is actually flowing through the reservoir at a rate high enough to keep some finer particles suspended in the fluid. Swirling and churning of the fluid in the tank, caused by draw down of the circulation pump and the action of conveyors, hinge belts, and the like moving through the reservoir, increase the percentage of finer particles that remain suspended in the coolant.

Even if the coolant in the dirty fluid reservoir could remain relatively stagnant, other factors such as viscosity and surface tension of the coolant would cause a certain percentage of fine particles to remain suspended in the fluid rather than settling out. This is particularly true for finer particle of light metals such as aluminum or magnesium. For the tight tolerances required in some machining operations, even this small percentage of suspended fine particles must be removed by some sort of filtration beyond that provided by the force of gravity.

Coolant cleaning systems that utilize a hinge belt or inlet screen to catch and convey away the chips and particles of waste material as the fluid enters the reservoir, rather than allowing them to settle to the bottom for removal by a conveyor, also must deal with the problem of removing the finer particles suspended in the fluid. All of the factors described above in relation to coolant cleaning systems relying on settlement of waste material in the bottom of the dirty fluid reservoir that cause finer particles to remain suspended in the fluid, such as swirling or churning of the fluid, surface tension effects, etc., are also present in cleaning systems that utilize inlet screens or hinge belts to capture the larger chips and particles as they enter the reservoir and allow the fluid to drain through into the reservoir by the force of gravity. For these systems, as a practical matter, the mesh size of the inlet screen or the spaces that allow passage of the fluid through the belt must be large enough to allow the majority of the waste material to be removed at very high rates, given the large volume of waste material that must be dealt with as a result of the high speeds of modern machining operations. Stated another way, floor space considerations place practical limitations on the size and operating capacities of particulate matter removal and conveying devices, resulting in their being designed to allow the passage of finer suspended particles in order to handle the volume of larger chips and particles in the space available for the inlet screen or conveyor.

In one approach to providing additional filtration of the coolant fluid, U.S. Pat. No. 5,738,782, to Schafer et al, utilizes an edge mounted stationary filter in a partition between a preliminary cleaning area and a clean chamber of a sedimentation chamber, and a scraper type cleaning device mounted on the edge mounted filter for removal of impurities adhering to the filter. It is not likely, however, that the approach taught by Schafer would allow the high coolant volume flow rates required for many modern machining operations.

In the most commonly utilized approach to providing additional filtration of the coolant fluid, a drum filter rotatable about an axis of rotation of the drum is provided. The drum includes a generally cylindrical shaped screen on the outer periphery of the drum. The drum filter is positioned within the dirty fluid reservoir in such a manner that fluid with entrained or suspended particles flows into the drum through the cylindrical screen in a direction of flow oriented generally perpendicular to the axis of rotation of the drum. An opening is provided in an end wall of the drum, and a corresponding opening is provided in a wall of the dirty fluid reservoir, so that once the fluid has flowed into the drum through the cylindrical filter in a direction perpendicular the axis of rotation, the cleaned fluid inside the drum can change direction inside the drum and exit through the opening in the end wall of the drum and the corresponding opening in the wall of the dirty fluid reservoir in a direction generally parallel to the axis of rotation of the drum. A dynamic seal is generally provided in the dirty fluid reservoir between the end wall of the drum and the wall of the dirty fluid reservoir to prevent the dirty fluid from bypassing the drum filter, and to prevent the cleaned fluid exiting the end wall of the drum from re-entering the dirty fluid reservoir. Backwash nozzles for directing a spray of fluid or air either at or outward through the cylindrical screen are also generally provided to remove particulate matter adhering to the outside of the cylindrical screen. Typically the backwash nozzles are located inside the drum. The drum is generally rotated either by a drum sprocket attached to the outer periphery of the drum in such a manner that a portion of a chip conveyor chain or belt moving under or over the outer periphery of the drum engages the sprocket and turns the drum, or by a separate drive apparatus for the drum.

Coolant cleaning systems utilizing drum filters are disclosed in U.S. Pat. No. 5,849,183 to Ota et al; U.S. Pat. No. 5,603,846 to Uchiyama et al; U.S. Pat. No. 5,167,839 to Widmer II et al; U.S. Pat. No. 4,992,167 to Uchiyama; and U.S. Pat. No. 4,895,647 to Uchiyama. Ota et al '183, and Uchiyama '167 disclose a filtration apparatus using multiple drum filters in a single filtration apparatus to provide fractional filtration of the dirty coolant so that filtered coolant with varying degrees of cleanliness can be supplied to match the cleanliness requirements of various machining operations.

Although such drum filters have been used for many years in coolant cleaning systems for machine tools, their use is subject to a number of problems, and further improvement is needed. Specifically, drum filters and their associated back washing and support systems are difficult to manufacture and maintain, and inherently subject to damage from the interaction of particulate matter being moved by the conveyor and the circumferential screen on the drum.

Where a drum filter is driven from a drag chain passing below the drum, or runs in close proximity to such a drag chain, as taught by Uchiyama '647 and '167, and by Widmer '839, the waste material being conveyed out of the dirty fluid reservoir by the conveyor must pass under drum in the small space formed by the close proximity between the drum's cylindrical screen and the bottom of the reservoir. A buildup of chips in this area frequently results in damaging the screen and jamming the conveyor. Clearing such a jam, and replacing a damaged cylindrical screen is not an easy task, due to the shape and location of the parts involved. Clearing a jammed conveyor or filter drum is especially difficult in scraper conveyors in many instances, because the scraper blades are angled with respect to the direction of chain movement in such a manner that makes it difficult to reverse the direction of the chain.

In most drum filter systems, the back washing nozzles are located inside the drum and spray coolant or air radially outward through the cylindrical screen to dislodge any particulate matter adhering to the outside of the screen. Getting fluid plumbing or air supply lines routed into the interior of the drum for connection to the back wash nozzles significantly complicates the design and manufacture of the drum. And if one of the back wash nozzles should become plugged, getting to the affected nozzle to unplug it may require a significant amount of disassembly, reassembly, and associated down time for the coolant system, to complete what should be a relatively simple repair operation.

Prior drum filter systems also typically have had to rely on a dynamic seal located in the dirty fluid reservoir, where the seal is exposed to the abrasive action of chips and particles of waste material floating in or passing through the dirty fluid. Seal life is thus reduced. Furthermore, should they become damaged, replacement of these dynamic seals typically involves a significant amount of disassembly, reassembly, possible removal of the drum, and associated down time for the coolant system, to replace the seal.

In systems where a drag chain or hinge belt passes over the outer periphery of the drum, such as those disclosed in Ota '183, Uchiyama '846 and Uchiyama '647, it may also be necessary to disconnect the chain or hinge belt so that the drum can be removed to replace the screen, unplug the nozzles, or replace the seal, thereby complicating repair procedures even further.

Because a drag chain conveyor or hinge belt conveyor cannot pass through the cylindrical space occupied by the drum, the fluid depth in the dirty fluid reservoir must be greater than it otherwise would have to be if the drum were not there. As a result of this extra depth, such drum filter systems often require a greater depth of coolant, and a taller dirty fluid reservoir profile than would otherwise be required. This extra depth slows the rate at which chips and particles settle to the bottom of the reservoir, because they have a longer vertical path through the viscous and swirling coolant, thereby increasing the length of time for such chips, etc., to cause damage to the seal or the screen while they are suspended in the fluid. Although the extra volume of fluid resulting from this extra depth might seem to provide an advantage in that the settling time between re-circulation is lengthened, the longer settling times required for the fluid to reach the bottom of the reservoir more than negate any advantage that the extra coolant volume might otherwise provide.

In some drum filter applications, such as those taught by Ota '183, Uchiyama '846, and Uchiyama '647, a drag chain wraps around a significant portion of the periphery of the drum and is used to drive the drum about its axis of rotation. In such applications, the side loads imposed by the chain on bearings supporting the drum during even normal operation are large, requiring the bearings and support structures to be more robust than they would otherwise have to be. And to allow for the possibility that the side loads will increase several fold, if the chain or the drum should become jammed, the bearings and support structure must be designed to be much larger than they otherwise would need to be.

It is an object of our invention, therefore, to provide an improved fluid cleaning method and system. Further objects of our invention include providing:

1) an improved filter apparatus and method for removing fine particles from coolant fluid used in machine tool operations;
2) an improved apparatus and method as in 1) above that can be readily retro-fifted into existing coolant fluid cleaning systems;
3) an improved filter apparatus that can be more readily manufactured and/or maintained and repaired than prior filters;
4) an improved filter apparatus that can be utilized to provide fractional cleaning of fluids;
5) an improved coolant fluid cleaning system for providing fractional cleaning of fluids;
6) an improved dynamic seal for rotatable filter assemblies
7) an improved coolant system having a lower profile than prior coolant fluid cleaning systems, thereby allowing the use of a system having a fine filter in machine tools, such as lathes, which have heretofore not been able to utilize prior coolant filtration apparatus;
8) an improved coolant fluid cleaning system requiring less floor space than prior systems; and
9) an improved coolant fluid cleaning system capable of simultaneously removing particulate matter located above, below and in between the upper and lower portions of a chip conveyor belt.

SUMMARY

Our invention provides such an improved coolant cleaning method, system, and apparatus, through the use of a filter disk assembly that defines and is rotatable about an axis of rotation of the disk, for removing particulate matter from a fluid flowing through the filter disk assembly in a direction substantially parallel to the axis of rotation of the filter disk assembly.

According to one aspect of our invention, an improved coolant cleaning system includes such a filter disk assembly, connected in fluid communication with an apparatus for circulating a flow of fluid through the filter disk assembly in a direction substantially parallel to the axis of rotation of the filter disk assembly. According to various embodiments of our invention, the filter disk assembly may include a generally planar filter screen having openings for passage of the fluid through the filter screen in a direction substantially parallel to the axis of rotation of the disk assembly. In various embodiments of our invention the apparatus for circulating a flow of fluid may include a dirty fluid reservoir, a conveyor for removing chips and particulate matter from the dirty fluid reservoir, a clean fluid reservoir, with the filter disk assembly providing the sole fluid communication path between the dirty and clean fluid reservoirs, and a fluid supply system having a pump for circulating fluid from the clean fluid reservoir through the disk filter assembly.

According to a second aspect of our invention, a coolant fluid cleaning system according to our invention may include several filter disk assemblies feeding into a single clean fluid reservoir to achieve high volume flow rates of clean fluid. Alternatively, a coolant fluid cleaning assembly according to another aspect of our invention may include several filter disk assemblies, having filter elements of increasingly finer mesh, feeding into several separate clean fluid reservoirs to provide fractionally filtered coolant fluid having varying degrees of cleanliness as required for various machining operations.

According to a third aspect of our invention, an array of back wash nozzles is provided to blast particulate matter clinging to the filter disk assembly back directly onto a hinge belt conveyor in the dirty fluid reservoir so that the conveyor may readily carry the particulate matter blasted loose from the filter disk to a waste material collection bin. Unlike prior coolant fluid cleaning systems wherein such nozzles were inconveniently located inside of a filter drum, however, the back wash nozzles of our invention are completely accessible and serviceable without disturbing either the filter disk or the hinge belt conveyor, so that the nozzles can be conveniently serviced if necessary.

According to another aspect of our invention, an improved two stage dynamic seal is provided for the filter disk assembly, having an elastomeric portion located in the clean fluid reservoir, rather than in the dirty fluid reservoir as in prior drum filter arrangements.

The generally discoidal shape of a filter disk according to our invention allows conveying devices, such as drag chains or hinge belts, to be routed through areas that would have been occupied by the cylindrical screen of the drum filters used in prior coolant fluid cleaning assemblies. This provides a number of advantages. The filter elements in our filter disk assemblies are far better protected inherently from wear, damage, and clogging or jamming than the cylindrical screens used in prior coolant fluid cleaning systems using drum type filters. The filter disk assemblies, dynamic seals, and backwash nozzles according to various aspects and embodiments of our invention can all be readily serviced and even replaced in a matter of a very few minutes without disturbing any conveying devices. Fluid depths in the dirty fluid reservoir can be lower than in prior cleaning systems using drum type filters.

In some embodiments of our invention, the height of the conveying device can also be significantly reduced in a manner allowing a coolant fluid cleaning system, including a filter disk assembly according to our invention for filtering out fine particulate matter, to be utilized with machine tools such as turning centers which have so little room available that it was previously not possible to conveniently provide a system having both a conveyor for particulate matter and a filter for fine particulate matter.

Either a filter disk assembly and/or a dynamic seal according to our invention is readily adaptable to existing coolant fluid cleaning systems that formerly had no fine filtering capability, or were originally equipped with drum type filters. According to one aspect of our invention, an adapter kit is provided to retrofit either the filter disk and/or the dynamic seal of our invention into existing coolant fluid cleaning systems.

These and other aspects, advantages, and novel features of our invention will be readily apparent upon consideration of the following drawings and detailed description of preferred embodiments.

DETAILED DESCRIPTION

Figure 1:
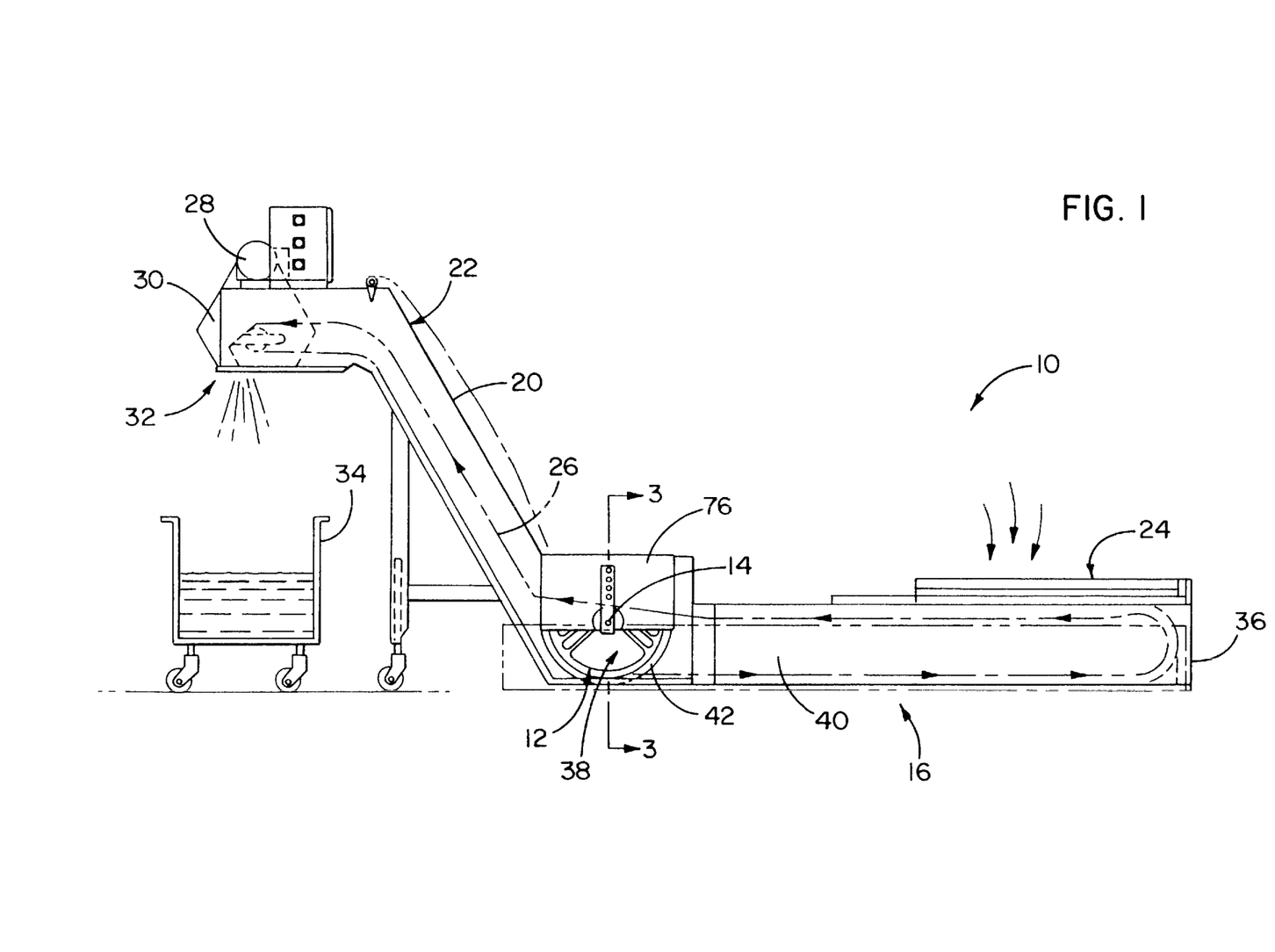
FIG. 1 depicts a side view of a coolant fluid cleaning apparatus, according to our invention, for use with a machine tool.
Figure 2:
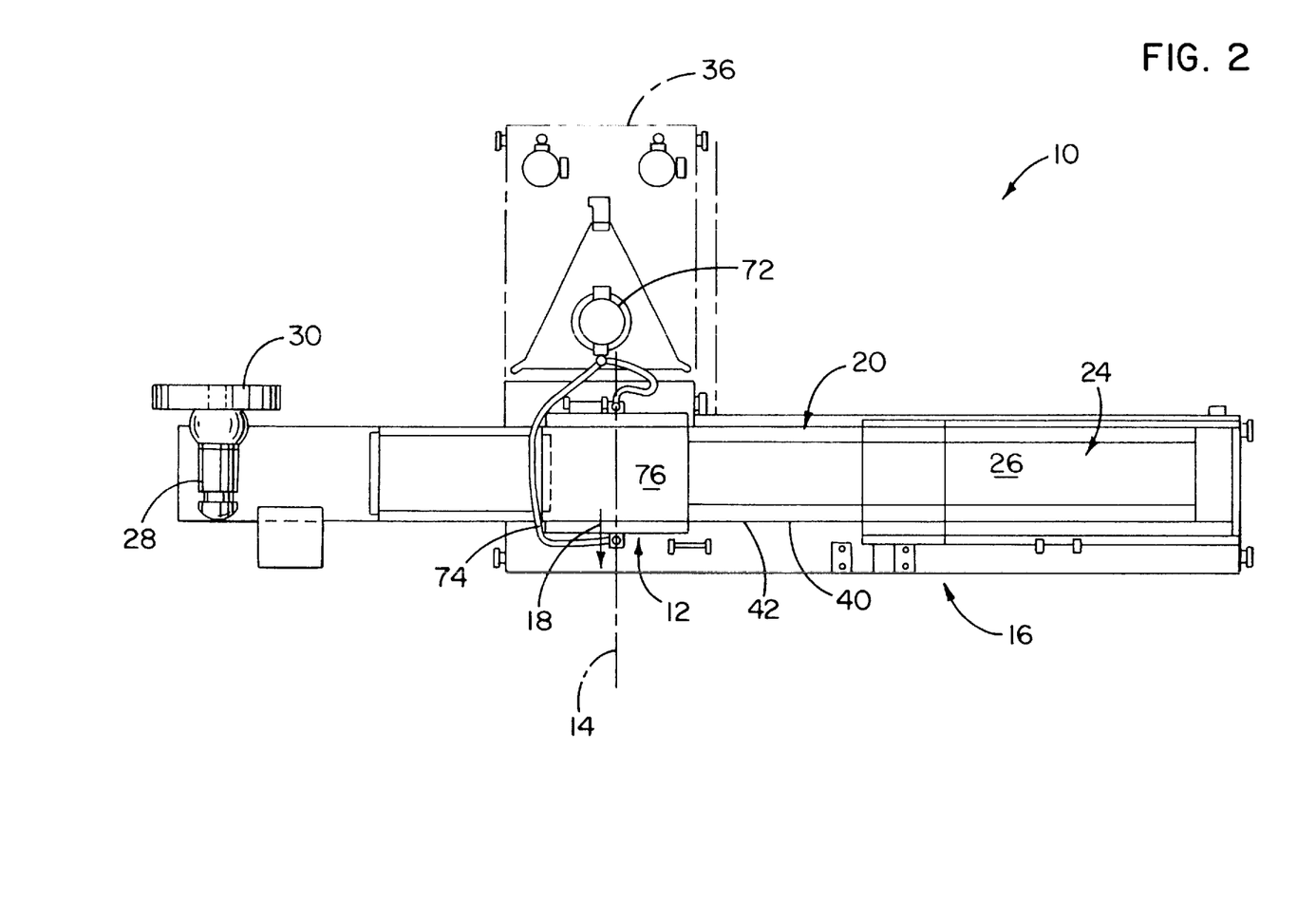
FIG. 2 is a top view of the coolant fluid cleaning apparatus for a machine tool depicted in FIG. 1.

FIGS. 1 and 2 illustrate an exemplary embodiment of our invention in the form of a coolant fluid cleaning system 10 for a machine tool, which is not shown . The coolant fluid cleaning system 10 includes a filter disk assembly 12 defining and journalled , as described in greater detail below, for rotation about an axis of rotation 14 of the filter disk assembly 12. The coolant cleaning system 10 further includes fluid circulating means 16, operably connected in fluid communication with the filter disk assembly 12, for circulating a flow of fluid through the filter disk assembly 12 in a direction 18 substantially parallel to the axis of rotation 14 of the filter disk 12.

The fluid circulating means 16 includes a first fluid reservoir, in the form of a conveyor housing 20 of a hinge belt conveyor 22. The conveyor 22 includes an inlet hopper 24 for receiving and retaining a flow of coolant fluid containing entrained chips and particles of waste material, hereinafter referred to as "dirty fluid," from a machine tool. The dirty fluid entering the hopper 24 falls onto a particulate matter conveying means, in the form of a hinge belt 26. The larger chips and particulate matter in the dirty fluid are caught by the belt 26, and the fluid with entrained finer particles passes through openings in the belt 26 into the conveyor housing 20. The larger chips and particles are then conveyed by the hinge belt 26 and drive means, in the form of a motor 28 and drive train 30 to a point of discharge 32, where the chips and particulate matter carried on the hinge belt 26 are discharged from the conveyor 22 into a chip collection bin 34.

The fluid circulating means 16 further includes an "L-shaped" second fluid reservoir 36 for receiving and retaining coolant fluid, hereinafter referenced as the clean fluid, after it has passed through the disk filter assembly 12. As best seen in FIGS. 1 and 2, the conveyor housing 20 rests partially within the L-shaped clean fluid reservoir 36. The conveyor housing 20 is a welded, fluid-tight, assembly. A seal plate 40 attached to a sidewall of the conveyor housing 20 defines an outlet opening 38 from the conveyor housing 20 and a sealing surface 42, which mates with the filter disk assembly 12 in a manner described in greater detail below, such that the only passage for fluid from the conveyor housing 20 into the clean fluid reservoir 36 is through the filter disk assembly 12.

Figure 3:
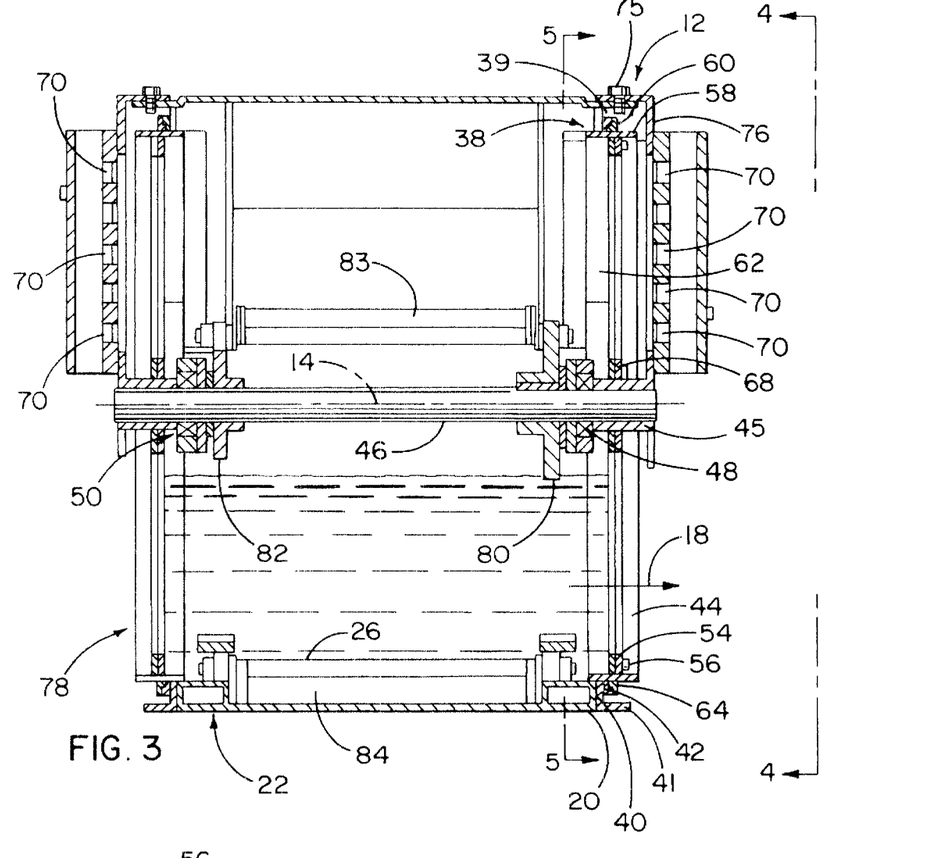
FIG. 3 is a sectional view of the coolant fluid cleaning apparatus depicted in FIG. 1, taken along line 3—3, as shown in FIG. 1.
Figure 4:
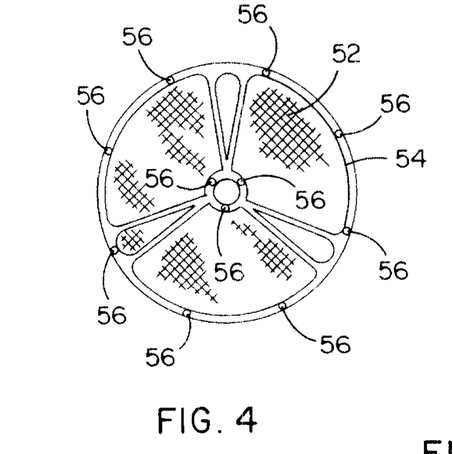
FIGS. 4 and 5 are partial sectional views of the coolant fluid cleaning apparatus depicted in FIG. 1, taken respectively along line 4—4, and 5—5, as shown in FIG. 3.

As shown in FIG. 3, the filter disk assembly 12 includes a frame 44, fixedly attached by a set screw, not shown, and a locking collar 45 to a shaft 46 journalled in bearings 48, 50 attached to the conveyor housing 20 for rotation about the axis of rotation 14 of the filter disk assembly 12. A filter element in the form of a screen 52 is clamped to the frame 44 of the filter disk assembly 12 using a clamping plate 54 and screws 56, as shown in FIGS. 3 and 4. In the exemplary embodiment, the screen 52 is flat, and fabricated from a stainless steel material having a mesh size of 20 to 400, with a mesh of 50 to 80 being preferred for most machine tool applications.

Figure 5:
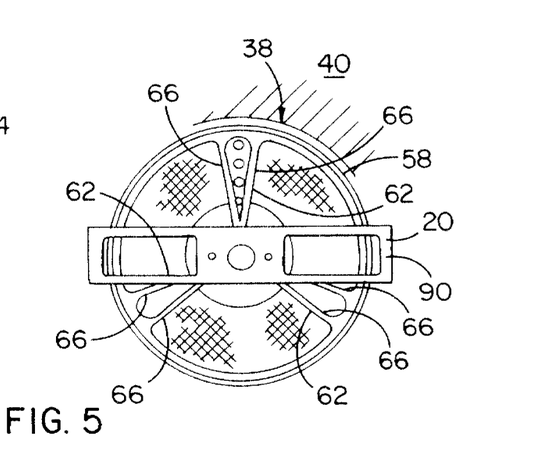

The ability to utilize a flat screen in our invention provides several advantages in comparison to the cylindrical shaped filters of prior fluid cleaning systems. A flat filter is much easier to fabricate than a cylindrical filter. It is also possible to fabricate a flat filter of materials, such as brittle ceramics, that could not be formed into a cylinder. Those having skill in the art will recognize, however, that filter elements of other materials or having configurations other than absolutely flat—convoluted, or crowned, for example—may also be utilized with efficacy in practicing our invention, and are considered by the inventors to be within the scope of the claims of this invention. Those having skill in the art will also recognize that the mesh size will be dependent upon the flow rate and degree of removal of fine particles required for a given application. It should also be noted that the term "screen" as used herein is intended to also encompass non-woven filter elements of other types formed by drilling, or other processes, The frame 44 includes an outer axially extending flange 58 which is configured to extend through and fit with only a small running clearance into the outlet opening 38 in the seal plate 40, as shown in FIGS. 3 and 5. The close fit between this flange 58 and the opening 38 provides the first stage of sealing the interface between the outlet opening 38 and the filter disk 12. The filter disk frame 44 also includes a radially extending annular sealing flange 60 attached to the outer periphery of the axially extending flange 58 for attachment of a compliant V-shaped dynamic seal 64 fabricated from an elastomeric material. When the filter disk assembly is clamped in place on the shaft 46, the V-shaped seal 64 is clamped between the sealing flange 60 and the sealing surface 42 of the conveyor housing 20, to thereby provide the second stage of a dynamic seal preventing dirty fluid from flowing past the filter disk assembly 12 into the clean fluid reservoir 36.

Those having skill in the art will readily recognize the superiority of a dynamic seal according to our invention as compared to the seals used in prior coolant fluid systems. Our seal is located in the clean fluid reservoir, rather than in the dirty fluid reservoir as in prior drum type filter arrangements, and is thus inherently protected against abrasion and damage from chips and particles entrained in the dirty fluid. Furthermore, the tight fit between the annular flange 58 of the filter disk assembly 12 and the outlet 38 provides a first stage of sealing against chips and particles that is not present in the dynamic seals of prior drum type filtration systems. Those having skill in the art will also grasp the advantages in manufacturability and maintainability provided by having the filter disk assembly 12 located in the clean fluid reservoir 36 and attached to the shaft in a manner that allows the filter disk 12 to be easily and quickly removed for replacement of the V-shaped seal 64.

As shown in FIG. 3, the seal plate 42 includes an upper flange 39 and a lower flange 40 extending outwardly therefrom in a direction away from the conveyor 22. These flanges 39,40 serve to protect the V-shaped seal 64 and the filter disc 12 from being bumped or damaged when the conveyor 22 is being moved inside or outside of the clean fluid reservoir 36.

As shown in FIG. 5, the frame 44 of the filter disk 12 is configured to provide large openings for the flow of fluid 18 in a substantially axial direction between spoke-like legs 66 joining the axially extending flange 58 to a central hub portion 68 of the frame 44. Particle lifting fins 62 are attached to some of the legs 66 in such a manner that when the filter disk assembly 12 is attached to the shaft 44, the lifting fins 62 extend into the dirty fluid reservoir to scoop up particulate matter that may have collected adjacent the screen 52 in the dirty fluid reservoir, and carry the scooped up particulate matter to the top of the outlet opening 38.

As shown in FIGS. 3 and 2, the fluid cleaning system 10 further includes back washing means in the form of an array of nozzles 70, a backwash supply pump 72, and a backwash fluid supply circuit 74. The nozzles 70 are mounted outboard of the filter disc assembly 12 and oriented to direct a spray of clean fluid back through the screen 52, in order to blast any particulate matter adhering to the dirty fluid reservoir side of the screen 52, and any particulate matter scooped up by the lifting fins 62 back onto the upper surface of the hinge belt 26 so that the particulate matter blasted from the screen 52 by the back wash nozzles 70 can be conveyed out of the dirty fluid reservoir 20 and deposited in the chip collection bin 34.

As shown in FIGS. 1–3, a cover 76 is provided to help direct the fluid spray from the backwash nozzles 70. The cover 76 is attached to the upper flange with screws 75. The cover 76 also functions as the mounting bracket for the back wash nozzles 70. A portion of the backwash fluid supply circuit 74 adjacent the nozzles is preferably fabricated of a flexible hose so that the cover 76 with the nozzles 70 connected can be quickly lifted off once the screws 75 are removed.

As shown in FIGS. 2 and 3, the exemplary embodiment of our invention depicted in FIGS. 1–5 includes a second filter disk assembly 78, and a second array of backwash nozzles 70, mounted on the left side of the conveyor housing 20, to allow a higher flow rate of clean fluid to flow through the filter disk assemblies 12,78 from the common dirty fluid reservoir 20. The construction details of the second filter disk assembly 78 and the second array of nozzles 70 are essentially identical to the corresponding parts of the first filter disk assembly 12 and the first array of nozzles 70, except that in some instances the parts and orientation are mirror images of the corresponding parts and orientations described above.

As shown in FIG. 3, the coolant fluid cleaning system 10 includes drive means in the form of a drive sprocket 80, and a guide roller 82 operably connecting the first and second filter disk assemblies 12,78 to the hinge belt 26 in such a manner that the conveyor drive train 30 and motor 28 rotatably drive the filter disk assemblies 12,78. The drive sprocket 80 is fixedly attached by a set screw bearing on a key in the shaft 44 in such a manner that as the hinge belt 26 is pulled through the conveyor 22 by the drive motor 28, the shaft 44 and both filter disk assemblies 12,78 are rotated about their common axis of rotation 14.

Because the hinge belt 26 of our invention can be routed between the filter disk assemblies 12,78, as shown in FIG. 3, rather than over and/or under the outer periphery of the drum filters used in prior filter systems, a coolant fluid cleaning system according to our invention provides several significant advantages over prior fluid cleaning systems. The filter disk assemblies 12,78 of our invention can be located lower in the dirty fluid reservoir 20 than would have been possible with a drum type filter. This allows the fluid level in the reservoir to be lower than it would have to be with a drum filter, resulting in a more compact design taking up less valuable floor space and being adaptable to use with more types of machine tools than prior systems using drum filters. Settling action in the dirty fluid reservoir is improved because, with the lower fluid level, it takes less time for particulate matter to reach the bottom of the reservoir. Placing the filter disk assemblies 12,78 lower in the dirty fluid reservoir 20 also increases the area of the outlet opening 38 below the fluid level, thereby improving the filtering efficiency of the filter disks. And, because the filter disk assemblies 12,78 can be located lower in the dirty fluid reservoir 20 with respect to the lower portion of the hinge belt 26 than would be the case with a drum type filter, head pressure available to drive the fluid through the screens 52 of the filter disk assemblies 12,78 is greater for a given fluid depth than could be achieved if the hinge belt 26 had to run under the outer periphery of the filter disk assemblies 12,78, as it would have had to do with a drum type filter.

Furthermore, as shown in FIGS. 1 and 3, because the hinge belt 26 does not have to travel over or under the outer periphery of the disks 12,78, it is possible to design the drive mechanism for the filter disks in such a manner that only a minimal amount of deviation in the path of the hinge belt 26 is required to engage and drive the drive sprocket 80, and the guide roller 82. Because there is little deviation in the path of the hinge belt 26 as it passes over the sprocket 80 and guide roller 82, side loads imposed on the bearings 48,50, the shaft 44, and their associated support structure are minimal, allowing the use of smaller bearings, etc., than would have been required if the hinge belt 26 could not pass between the filter disk assemblies 12,78.

In a preferred embodiment of our invention, a series of stiff cleats 83 are intermittently attached to and extend outward from approximately every eighth hinge flap of the hinge belt 26, to facilitate conveying the chips and particulate material to the chip bin 34. In addition, one or more of the cleats 83 is omitted and replaced with a thin flexible scraper blade 84, attached to the hinge belt and configured to sweep along the bottom surface of the conveyor housing 20. As the hinge belt 26 traverses the bottom of the conveyor housing 20, these cleats 83 and the scraper 84 sweep any particulate matter that has settled in the bottom of the dirty fluid reservoir 20 along the bottom, up the end of the conveyor housing 20 and onto the top surface of the hinge belt 26 so that this particulate matter can be conveyed to the chip bin 34.

These cleats 83 and scrapers 84 on the hinge belt 26, in combination with the other aspects and features of our invention described above, provide a coolant fluid cleaning system 10 having the capability of simultaneously removing particulate matter located above, below, and between the upper and lower portions of the hinge belt 26. To the best of the inventor's knowledge and belief, no prior coolant fluid cleaning system has the capability to do this. Chips and particles of waste material entering the hopper 24 entrained in dirty coolant fluid drained from the machine tool initially encounter the upper surface of the upper portion of the hinge belt 26. All material that is too large to pass through the gaps between the hinge flaps of the hinge belt 26 is immediately conveyed to the chip bin 34. The finer particulate matter that passes through the hinge belt 26 is filtered out by the filter disk assemblies 12,78 and lifted back above the belt by the lifting fins 62, or by adhering to the dirty side of the screen 52, and then blasted off of the screen 52 and/or lifting fin 62, back onto the upper surface of the hinge belt 26, by the back wash nozzles 70, to be conveyed to the chip bin 34 by the hinge belt 26. Any particulate matter that makes it all the way to the bottom of the dirty fluid reservoir 20 by settling, or somehow bypassing or being carried around on the hinge belt 26, is swept back up to the top side of the hinge belt 26 and conveyed to the chip bin 34.

From the foregoing description, those having skill in the art will readily recognize that a coolant fluid cleaning method, system, and apparatus according to our invention provide significant advances over prior coolant fluid cleaning method, system, and apparatus. Those skilled in the art will further recognize that although we have described the invention herein with respect to certain specific embodiments and applications thereof, many other embodiments and applications are possible within the scope of our invention as described in the appended claims.

Figure 6A:
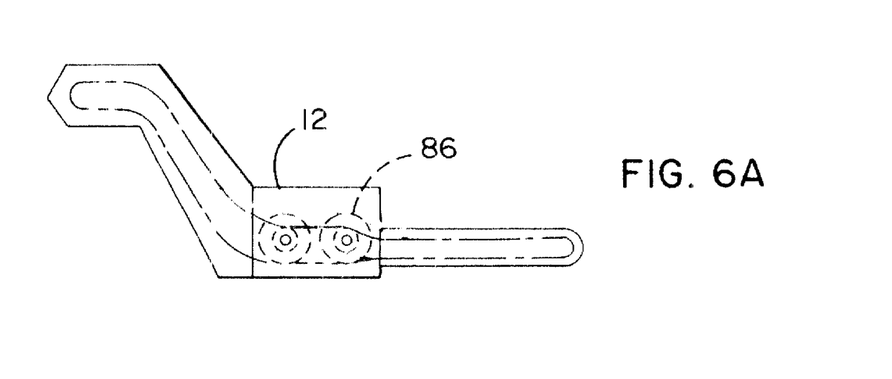
FIGS. 6a, 6b, and 6c, are depictions of alternate embodiments of coolant fluid cleaning systems according to our invention.

For example, although the exemplary embodiment illustrated in FIG. 1 utilized two filter disk assemblies 12,78 having identical configurations arranged to provide parallel flow paths between a single dirty fluid reservoir and a single clean fluid reservoir, other combinations are possible and contemplated by the inventors within the scope of the foregoing description and the appended claims. As shown in FIG. 6a, additional filter disk assemblies 86 could be utilized to increase the number of parallel flow paths available, and in combination with adjustments in the screen mesh, allow the rate of flow of clean coolant and the degree of cleanliness to be adjusted to suit a particular application of our invention. Alternatively, by utilizing screens 52 of different mesh in several filter disk assemblies feeding separate clean fluid reservoirs, fractional filtration can be provided from a single dirty fluid reservoir.

Figure 6B:
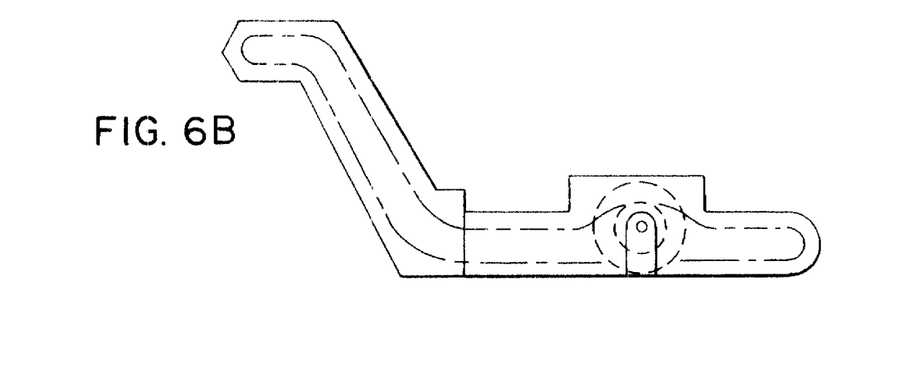

As shown in FIG. 6b, the filter disk assemblies of our invention can be located at positions along the side walls of the conveyor other than the position illustrated in FIGS. 1 through 5. A filter disk assembly 12 according to our invention can also be located in an end wall of a conveyor, and other types of conveying devices, such as an auger, a scraper chain, or a continuous belt, can be used in place of the hinge belt conveyor.

Figure 6C:
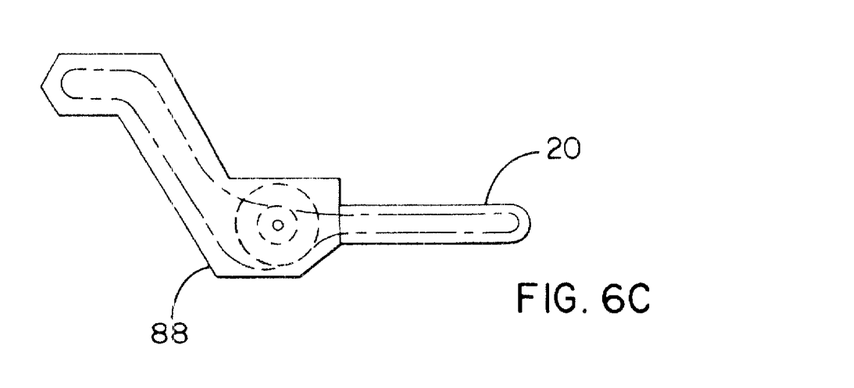

As shown in FIG. 6c, the filter disk assemblies of our invention can be utilized in conjunction with a low profile conveyor, by locating the filter disc assemblies in a sump 88 formed in the bottom wall of the conveyor housing 20, to provide a coolant fluid cleaning device having both chip conveying and fluid filtering capability in a system suitable for use on machine tools, such as lathes, that have not previously been able to utilize a fluid filter because there was simply not enough space available to accommodate the larger conveyor and filter apparatus of prior systems utilizing drum filters.

We also contemplate embodiments of our invention in the form of a kit for retrofitting filter disk assemblies and/or the improved dynamic seals of our invention into existing fluid cleaning devices that were originally designed without a fine filter, or including a drum type filter.

Figure 7:
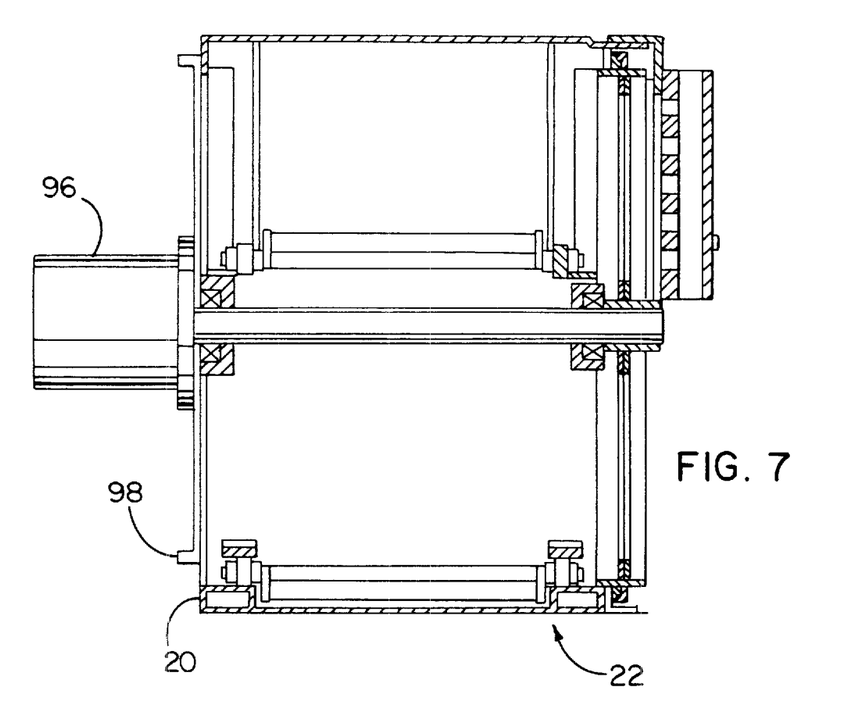
FIG. 7 is a sectional view of an alternate embodiment of a coolant fluid cleaning apparatus, according to our invention, having a dedicated drive system for a filter disk assembly of the coolant fluid cleaning apparatus.

For example, as shown in FIG. 3, if the conveyor 22 had been originally built without a fine filter, such a kit for retrofitting filter disk assemblies 12,78 according to our invention into the conveyor 22 would include: a pair of seal plates 42; the filter disk assemblies 12,78; the back wash means; and adapter drive means for operatively connecting the filter disks 12,78 to the conveyor housing 20 and the existing hinge belt conveyor 26. The adaptor drive means would include a shaft 46, a drive sprocket 80, the guide roller 82, a pair of bearing support brackets 90 such as those shown in FIG. 5, the bearings 48,50, and the various locking collars set screws, spacers, and the like used to secure and operatively connect the various elements of the adaptor drive means to the filter disk assemblies 12,78. To retrofit the filter disk assemblies 12,78 into the conveyor 22, the bearing plates 42 and the bearing support brackets 90 would be attached to the conveyor housing 20, by welding for instance, and holes would be cut in the conveyor housing 20 corresponding to the outlet openings 38 in the seal plates 42. The remainder of the parts in the retrofit kit as defined above would then be installed as shown in FIG. 3 to complete the retrofit. If the conveyor 22 had originally been built with a drum filter, the retrofit process would be essentially the same, but the drum would be removed in the retrofit process. As shown in FIG. 7, the retrofit process could be simplified by providing in the retrofit kit a separate drive motor 96 for the filter disk assembly 12 mounted on a motor mount plate 98 attached to the conveyor housing 20, so that the need to operatively connect the filter disk assembly 12 to the existing drive means in the conveyor is eliminated.

Figure 8:
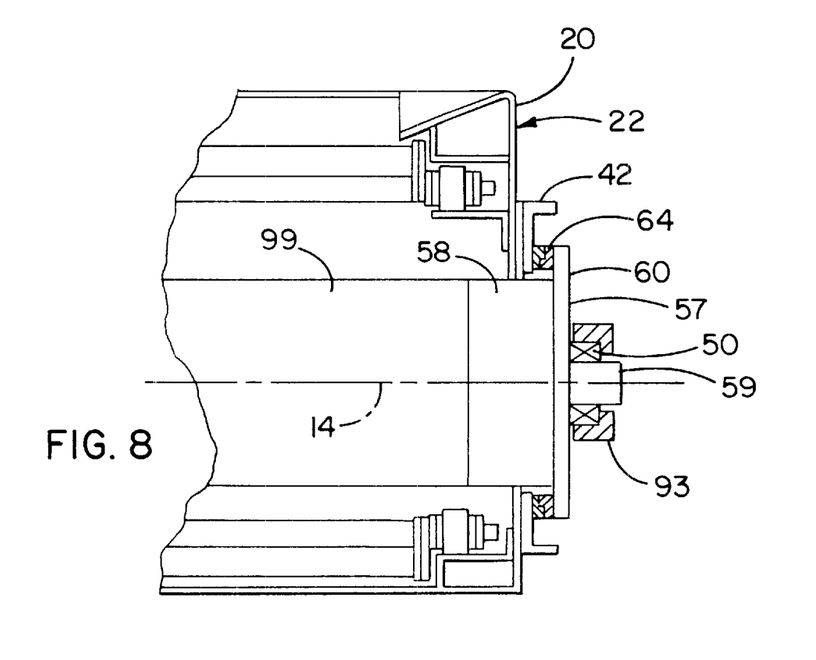
FIG. 8 is a partial sectional view of an embodiment of our invention wherein an improved dynamic seal, according to our invention, is utilized with a drum type filter.

As shown in FIG. 8, we also contemplate that the improved dynamic seal of our invention could be adapted for use with a drum type filter 99. A seal plate 42 having an outlet opening 38 is attached to the conveyor housing 20 in the same manner as described herein with regard to mounting a filter disk assembly according to our invention. A seal adapter housing 57 having an axially extending annular portion 58 closely matching the diameter of the outlet opening 38 is attached to the filter drum 99. The seal adapter housing 57 further includes a radially extending annular sealing flange 60, and a stub shaft 59 for mounting the drum 99 in bearing 50, which is in turn mounted in a bearing support bracket 93 attached to the conveyor housing 20. A V-seal 64 is attached to the radially extending flange 60 and in such a manner that when the drum 99 with the seal adapter housing 57 attached is mounted for rotation about the axis 14, the V-seal is compressed to provide a fluid seal between the seal plate 42 and the radially extending annular flange 60 of the seal adapter housing 57. This arrangement provides the same advantages in a drum filter of two stage sealing and locating the V-seal in the clean fluid reservoir that are provided by the practice of the improved seal of our invention with filter disk assemblies according to our invention.

We wish to expressly state that, although many of the exemplary embodiments described herein are directed to the practice of our invention in a coolant fluid cleaning apparatus or system for a machine tool, we contemplate many other applications of our invention in other types of fluid filtering systems. Specifically, we contemplate that these other applications might include but not be limited to water filtration equipment, filtering of water used with automatic floor cleaning or street sweeping materials, and filtering of fluids used in conjunction with cut-off saws, grinding machines, and fluid jet cutters.

It is understood, therefore, that the spirit and scope of the appended claims should not be limited to the specific embodiments described and depicted herein.

We claim:

1. A fluid cleaning system comprising:
   a) a filter disk assembly, defining and being rotatable about an axis of rotation of said filter disk assembly, for removing particulate matter from fluid flowing through said filter disk assembly in a direction substantially parallel to said axis of rotation of said filter disk; and
   b) means in fluid communication with said filter disk assembly for circulating a flow of fluid through said filter disk assembly in a direction substantially parallel to said axis of rotation, said means for circulating including a clean fluid reservoir and a dirty fluid reservoir divided from one another by a wall having a flat section extending generally perpendicular to the axis of rotation of the filter disk assembly and having an opening in said flat section for passage therethrough from said dirty to said clean reservoir of a fluid which may contain particulate matter;
   said filter disk assembly being mounted adjacent said wall in said clean fluid reservoir and aligned with said opening to intercept particulate matter from fluid flowing through said opening from said dirty fluid reservoir into said clean filter reservoir, said filter disk in said clean fluid reservoir thereby having reduced exposure to abrasion from the particulate matter.

2. The fluid cleaning system of claim 1 further including drive means operably connected to said filter disk assembly for rotatably driving said filter disk assembly about said axis of rotation of said filter disk assembly, said drive means extending through said wall from said dirty fluid reservoir.

3. The fluid cleaning system of claim 2 wherein said drive means includes a motor for driving said filter disc assembly.

4. The fluid cleaning system of claim 1 further including backwash means for removing particulate matter from said filter disk assembly by directing a flow of fluid through said filter disk assembly in a direction opposite said fluid flowing from said dirty fluid reservoir to said clean fluid reservoir to thereby direct particulate matter clinging to said filter disk assembly back into said dirty fluid reservoir.

5. The fluid cleaning system of claim 4 wherein said filter disk assembly defines a clean side thereof in said clean fluid reservoir and a dirty side thereof in said dirty fluid reservoir and said backwash means includes one or more nozzles for directing a flow of fluid at said clean side of said filter disk assembly.

6. The fluid cleaning system of claim 1 wherein said wall defines a clean side thereof in said clean reservoir and said filter disk assembly further includes seal means for sealing said filter disk assembly to said clean side of said wall and directing said flow of fluid through said filter disk assembly.

7. The fluid cleaning system of claim 1 wherein said means for circulating further includes particulate matter conveying means, disposed within said dirty fluid reservoir for removing particulate matter from said dirty fluid reservoir.

8. The fluid cleaning system of claim 7 wherein said particulate matter removing means includes a hinge belt assembly.

9. The fluid cleaning system of claim 8 wherein said particulate matter conveying means is operably connected to said filter disk assembly for rotatably driving said filter disk assembly about said axis of rotation of said filter disk assembly.

10. The fluid cleaning system of claim 8 wherein said hinge belt assembly includes a scraper for sweeping a surface of said first fluid reservoir.

11. The fluid cleaning system of claim 10 wherein said scraper is a thin flexible blade.

12. The fluid cleaning system of claim 11 wherein said scraper is an elastomeric material.

13. The fluid cleaning system of claim 1 wherein said means for circulating further includes a fluid supply system for circulating fluid from said clean fluid reservoir through the filter disk assembly.

14. The fluid cleaning system of claim 1 wherein said filter disk assembly includes a filter element in the form of a substantially flat screen having a first mesh size for removal of particulate matter from said fluid flowing in a direction substantially parallel to said axis of rotation of said filter disk assembly.

15. The fluid cleaning system of claim 14 further including:
   a second filter disk assembly operably connected in fluid communication with said means for circulating, and said wall between said clean and dirty reservoirs has a further flat section extending generally perpendicular to the axis of rotation of the second filter disk assembly and having a second opening in said further flat section for passage of fluid therethrough from said dirty to said clean reservoir of a fluid which may contain particulate matter;
   said second filter disk assembly being mounted adjacent said further flat section of said wall in said clean fluid reservoir and aligned with said opening in said further flat section to intercept particulate matter from fluid flowing through said second opening from said dirty fluid reservoir into said dean filter reservoir, said filter disk in said clean fluid reservoir thereby having reduced exposure to abrasion from the particulate matter.

16. The fluid cleaning system of claim 15 wherein said means for circulating further comprises a second clean fluid reservoir including said further flat wall section, said second clean fluid reservoir receiving a flow of fluid exclusively from said second filter disk assembly.

17. The fluid cleaning system of claim 16 wherein said second filter disk assembly includes a filter element having a second mesh size, said first and second filter disk assemblies thereby providing fractionally filtered fluid to said first and second dean fluid reservoirs respectively.

18. The fluid cleaning system of claim 1 wherein said filter disk includes a lifting fin for transporting particulate matter about said axis of rotation.

19. A dynamic seal apparatus for sealing an interface between a circular shaped fluid passage opening in a wall of a fluid reservoir and a fluid filter journalled within said reservoir for rotation about an axis of rotation of said filter, said seal apparatus comprising:
  a) a seal housing defining an axis of rotation of said seal and adapted for attachment to said filter apparatus in axial alignment with said axis of rotation of said filter, said housing including an axially extending annular portion thereof having an outer diameter centered about said axis of rotation of said seal and contoured to fit within said fluid passage with minimal radial clearance, said housing also including a radially extending annular sealing flange extending outward from said outer diameter of said axially extending portion of said housing;
  b) an annular pliable seal element attached to said radially extending flange and extending along said axially oriented portion of said housing, said seal element having a generally axially facing surface thereof opposite said radially extending flange adapted for compression against said wall of said reservoir when said seal apparatus is installed in said fluid passage of said reservoir.

20. The dynamic seal apparatus of claim 19 wherein said seal apparatus further includes a seal plate adapted for attachment to said wall about said fluid passage, said seal plate including a sealing surface thereof opposite said wall for said pliable seal element to bear against when said seal apparatus is installed in said fluid passage.

21. The dynamic seal apparatus of claim 19 wherein said reservoir includes a dirty fluid reservoir portion thereof and a clean fluid portion thereof separated by said wall, and said seal apparatus is mounted in said clean fluid reservoir with only a distal end portion of said axially extending annular flange extending through said fluid passage into said dirty fluid reservoir.

22. The dynamic seal apparatus of claim 19 wherein said fluid filter is a drum filter.

23. The dynamic seal apparatus of claim 19 wherein said fluid filter is a filter disk assembly.

24. A rotatable fluid filter disk assembly adapted for mounting in a circular opening in a wall of a fluid reservoir, said filter disk assembly comprising the combination of:
  c) a filter disk frame, defining and adapted to be journalled for rotation about an axis of rotation of said filter disk assembly when said filter disk assembly is operably mounted in said reservoir;
  d) a filter element adapted for attachment to said frame, for removing particulate matter from fluid flowing through said filter disk assembly in a direction substantially parallel to said axis of rotation of said filter disk; and
  c) a dynamic seal apparatus for sealing an interface between the circular opening in said wall of said fluid reservoir and said filter disk assembly, said seal apparatus comprising:
    a seal housing defining an axis of rotation of said seal and adapted for attachment to said filter apparatus in axial alignment with said axis of rotation of said filter disk assembly, said housing including an axially extending annular portion thereof having an outer diameter centered about said axis of rotation of said seal and contoured to fit within said circular opening in said wall with minimal radial clearance, said housing also including a radially extending annular sealing flange extending outward from said outer diameter of said axially extending portion of said housing; and
    an annular pliable seal element attached to said radially extending flange and extending along said axially oriented portion of said housing, said seal element having a generally axially facing surface thereof opposite said radially extending flange adapted for compression against said wall of said reservoir when said seal apparatus is installed in said circular opening of said reservoir.

25. The filter disk assembly of claim 24 wherein said filter element is a mesh screen.

26. The filter disk assembly of claim 24 wherein said seal apparatus further includes a seal plate adapted for attachment to said wall about said circular opening, said seal plate including a sealing surface thereof opposite said wall for said pliable seal element to bear against when said filter disk assembly is installed in said circular opening.

27. The filter disk assembly of claim 26 wherein said reservoir includes a dirty fluid reservoir portion thereof and a clean fluid portion thereof separated by said wall, and said filter disk assembly is mounted in said dean fluid reservoir with only a distal end portion of said axially extending annular flange extending through said circular opening into said dirty fluid reservoir.

28. The rotatable filter disk assembly of claim 24 wherein said frame includes a lifting fin for transporting particulate matter about said axis of rotation.

* * * * *